(12) United States Patent
Mizuta

(10) Patent No.: US 8,562,447 B2
(45) Date of Patent: Oct. 22, 2013

(54) TORSIONAL SHOCK ABSORBING APPARATUS

(75) Inventor: Atsuhisa Mizuta, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/512,727

(22) PCT Filed: Dec. 11, 2009

(86) PCT No.: PCT/JP2009/006780
§ 371 (c)(1),
(2), (4) Date: May 30, 2012

(87) PCT Pub. No.: WO2011/070623
PCT Pub. Date: Jun. 16, 2011

(65) Prior Publication Data
US 2012/0244953 A1    Sep. 27, 2012

(51) Int. Cl.
*F16F 15/123*    (2006.01)
(52) U.S. Cl.
USPC ........................................ 464/68.92
(58) Field of Classification Search
USPC .......... 464/68.1, 68.9, 68.92; 192/212–214.1, 192/30 V, 55.2–55.7, 200–211
See application file for complete search history.

(56) References Cited

U.S. PATENT DOCUMENTS

| | | | |
|---|---|---|---|
| 5,863,253 A | 1/1999 | Rohs et al. | |
| 6,283,864 B1 | 9/2001 | Reik et al. | |
| 6,612,933 B2 | 9/2003 | Uehara | |
| 6,676,525 B2 | 1/2004 | Uehara | |
| 6,712,706 B2 * | 3/2004 | Jackel et al. | ........... 192/214.1 X |
| 7,516,828 B2 | 4/2009 | Kitada | |
| 2002/0039925 A1 | 4/2002 | Uehara | |
| 2002/0173361 A1 | 11/2002 | Uehara | |
| 2004/0119218 A1 | 6/2004 | Imanaka et al. | |
| 2004/0200313 A1 | 10/2004 | Kroll et al. | |
| 2006/0102444 A1 | 5/2006 | Kitada | |
| 2008/0237950 A1 * | 10/2008 | Oono et al. | |

FOREIGN PATENT DOCUMENTS

| | | |
|---|---|---|
| EP | 0 777 059 A2 | 6/1997 |
| EP | 1 353 086 A1 | 10/2003 |
| JP | A-59-200815 | 11/1984 |
| JP | A-60-136622 | 7/1985 |
| JP | U-5-45259 | 6/1993 |

(Continued)

OTHER PUBLICATIONS

International Search Report issued in International Patent Application No. PCT/JP2009/006780 dated Mar. 16, 2010 (with translation).

*Primary Examiner* — Gregory Binda
*Assistant Examiner* — Josh Skroupa
(74) *Attorney, Agent, or Firm* — Oliff & Berridge, PLC

(57) ABSTRACT

A torsional shock absorbing apparatus is constructed to have the outer peripheral portions of first spring seats move along the outer supporting edge portions of the side plate when the hub is twisted with respect to the side plate in the positive rotation side, and to have the outer peripheral portions of second spring seats move along the outer supporting edge portions when the hub is twisted with respect to the side plate in the negative rotation side. The sliding resistance of the first spring seat and the outer supporting edge portions is larger than the sliding resistance of the second spring seat and the outer supporting edge portions.

5 Claims, 10 Drawing Sheets

(56) References Cited

FOREIGN PATENT DOCUMENTS

| JP | A-7-293580 | 11/1995 |
| JP | A-2002-106640 | 4/2002 |
| JP | A-2002-340095 | 11/2002 |
| JP | A-2004-183870 | 7/2004 |
| JP | A-2006-144861 | 6/2006 |

* cited by examiner

TORSIONAL SHOCK ABSORBING APPARATUS

TECHNICAL FIELD

The present invention relates to a torsional shock absorbing apparatus, and more particularly to a torsional shock absorbing apparatus for transmitting torque while absorbing torque fluctuation with a coil spring.

BACKGROUND ART

Up until now, there has been proposed an automotive vehicle which comprises a drive source such as an internal combustion engine, an electric motor and the like, and vehicle wheels drivably connected with the drive source through a power transmission train to enable the driving force from the drive source to be transmitted to the vehicle wheels through the power transmission train. The power transmission train with which the drive source is drivably connected is apt to generate a muffled sound and a "jara sound" originated for example from the rotation fluctuation caused by the torque fluctuation of the internal combustion engine.

The term "jara sound" is intended to indicate an abnormal sound generated by the idling gear sets of the transmission gear sets collided by torsional vibrations originated from the rotation fluctuation caused by the torque fluctuation of the internal combustion engine. The term "muffled sound" is intended to indicate an abnormal sound generated in the passenger room by the vibrations caused by the torsional resonance of the power transmission train having the torque fluctuation of the internal combustion engine as a vibratory force. The torsion resonance of the power transmission train exists in the normal drive area (for example about 2500 rpm of the rotation number of the internal combustion engine for the "FF" vehicle) of the internal combustion engine of a vehicle travelling at a low speed.

In view of this problem, usually provided is a torsional shock absorbing apparatus, i.e., a damper mechanism between the internal combustion engine and the power transmission train to absorb the rotation fluctuation of the internal combustion engine, and thus to absorb the torsional vibrations of the power transmission train.

There has so far been known a torsional vibration absorbing apparatus which comprises a first rotation member selectively engaged with or disengaged from a flywheel, a second rotation member drivably connected with an input shaft extending from a transmission, and a coil spring having the first rotation member resiliently connected with the second rotation member in the rotation direction of the first and second rotation members (for example see Patent Document 1).

The first rotation member is constituted by a clutch disc, and a pair of side plates secured to the inner peripheral portion of the clutch disc. The second rotation member is constituted by a hub which in turn comprises a boss splined to the outer peripheral portion of the shaft, and a flange portion formed to extend radially outwardly of the boss.

The coil spring is supported on a plurality of spring accommodating windows formed in the flange portion, and a pair of spring accommodating portions formed on the pair of side plates in the face-to-face relationship with the spring accommodating windows, respectively.

The coil spring thus constructed is compressed in the circumferential direction of the input plate between the pair of input plates and the hub, when the pair of side plates and the hub are relatively rotated with each other. The coil spring thus compressed can absorb the circumferential direction torsional vibrations inputted to the hub by the pair of side plates and suppress the "jara sound".

On the other hand, there is provided a hysteresis mechanism constituted by a thrust member disposed between the hub and the pair of the side plates to generate hysteresis torque caused by the frictional force between the hub and the pair of the side plates, and thus to suppress the torsional resonance of the power transmission train, thereby making it possible to lessen the muffled sounds remarkably increased in the vehicle room at the slow speed travelling of the vehicle.

On the other hand, it is well known that the internal combustion engine has fluctuation properties different at the acceleration time of the vehicle when the rotation torque is transmitted from the pair of the side plates to the hub to have the hub rotated with the pair of the side plates at a positive rotation side, from at the deceleration time of the vehicle when the rotation torque is transmitted from the hub to the pair of the side plates to have the hub rotated with the side plates in a negative rotation side.

FIG. 9 is a graph showing the relationship of the rotation fluctuations of the internal combustion engine at the acceleration time and at the deceleration time of the vehicle. As shown in FIG. 9, the rotation fluctuation of the internal combustion engine at the acceleration time is large in the low rotation speed area of the internal combustion engine, while the rotation fluctuation of the internal combustion engine at the deceleration time is large in the high rotation speed area of the internal combustion engine For this reason, it is required that the hysteresis torque of the damper mechanism increased at around the resonance point at the acceleration time of the vehicle causes the torsional resonance of the power transmission train in the low speed rotation area of the internal combustion engine to be suppressed, while the hysteresis torque of the damper mechanism decreased in the high speed rotation area with the large fluctuation of the internal combustion engine at the deceleration time of the vehicle causes the attenuation force to be increased to suppress the torsional vibrations.

The conventional damping apparatus is, however, set to have a single hysteresis at the acceleration and deceleration times, thereby resulting in the fact that the hysteresis set to be large in the damping apparatus can attenuate the torsional vibrations of the power transmission train in the low speed rotation area of the internal combustion engine at the acceleration time of the vehicle, however, is apt to make it impossible to sufficiently attenuate the torsional vibrations at the deceleration time of the vehicle.

In the case that the hysteresis torque is decreased for the purpose of absorbing the torsional vibrations at the deceleration time of the vehicle, the torsional resonance of the power transmission resonance causes the torsional vibrations to be increased at around the resonance point at the deceleration time of the vehicle, thereby leading to generating the muffled sounds (see dotted line in FIG. 10).

In contrast, another torsional shock absorbing apparatus of this kind is proposed to change the hysteresis torque at the acceleration time and at the deceleration time. The above torsional shock absorbing apparatus comprises a friction generating mechanism intervening between the pair of side plates and the hub to generate frictional force when the pair of side plates and the hub are relatively rotated with each other. The friction generating mechanism is constituted by a first friction generating portion for generating the frictional force between the pair of side plates and the hub in the positive and negative rotation sides of the torsional property, and a second friction generating portion for not generating the frictional force between the pair of the side plates and the hub, resulting from the fact that the side plates are not engaged with the hub in the negative rotation side of the torsional property (for example see Patent Document 2).

The above torsional resonance apparatus can suppress the torsional resonance by increasing the hysteresis torque at the acceleration time of the vehicle, and thus can increase the attenuation force by decreasing the hysteresis torque at the deceleration time of the vehicle.

CITATION LIST

Patent Literature

{PTL1} Patent Publication No. 2006-144861
{PTL2} Patent Publication No. 2002-106640

SUMMARY OF INVENTION

Technical Problem

However, the conventional torsional shock absorbing apparatus is constructed to have the friction generating mechanism intervening between the pair of side plates and the hub, and having the first friction generating portion and the second friction generating portion, thereby encountering such a problem that the friction generating mechanism is complicated in construction, the friction generating mechanism provided results in the increased number of parts forming the torsional shock absorbing apparatus, the production operation of the torsional shock absorbing apparatus is laborious, and the production cost is increased.

The present invention has been made to solve the previously mentioned problems, and has an object to provide a torsional shock absorbing apparatus which can set an optimum hysteresis torque in the positive and negative rotation sides with a simple construction and without increasing the number of parts forming the torsional shock absorbing apparatus, can improve the workability of producing operations, and can prevent the production cost from being increased.

Solution to Problem

To achieve the previously mentioned object, the torsional shock absorbing apparatus according to the present invention, (1) comprises: a first rotation member having spring accommodating windows formed therein, a second rotation member disposed in coaxially rotatable relationship with the first rotation member and having spring accommodating portions positioned in face-to-face relationship with the first rotation member, springs partly disposed in the spring accommodating windows and the spring accommodating portions and compressed in response to the positive and negative torsional movements of the first rotation member with respect to the second rotation member to have the torque transmitted between the first rotation member and the second rotation member, a first seat member and a second seat member respectively disposed between the circumferentially end portions of the springs and the circumferentially end portions of the spring accommodating windows and the coil spring accommodating portions, for supporting circumferentially end surfaces of the springs respectively, the first seat member having an outer peripheral portion movable along the coil spring accommodating portion of the second rotation member in response to the positive torsional movement of the first rotation member with respect to the second rotation member, and the second seat member having an outer peripheral portion movable along the coil spring accommodating portion of the second rotation member in response to the negative torsional movement of the first rotation member with respect to the second rotation member, the first seat member and the coil spring accommodating portion having a sliding resistance to be generated therebetween, and the second seat member and the coil spring accommodating portion having a sliding resistance to be generated therebetween, the sliding resistance of the first seat member and the coil spring accommodating portion being larger than the sliding resistance of the second seat member and the coil spring accommodating portion.

The torsional shock absorbing apparatus is constructed to have the first seat member move along the coil spring accommodating portion of the second rotation member in response to the positive torsional movement of the first rotation member with respect to the second rotation member, and to have the second seat member move along the coil spring accommodating portion of the second rotation member in response to the negative torsional movement of the first rotation member with respect to the second rotation member, thereby making the sliding resistance of the first seat member and the coil spring accommodating portion larger than the sliding resistance of the second seat member and the coil spring accommodating portion, so that the hysteresis torque can be increased in the positive rotation side, while the hysteresis torque can be decreased in the negative rotation side.

Due to the fact that the magnitude of the hysteresis torque can be changed in the positive rotation side and in the negative rotation side as previously mentioned, at the acceleration time of the vehicle when the first rotation member is twisted with respect to the second rotation member in the positive rotation side, the torsional vibrations caused after the torsional resonance point can be suppressed, and the muffled sounds can be suppressed from being generated.

On the other hand, at the deceleration time of the vehicle when the first rotation member is twisted with respect to the second rotation member in the negative rotation side, the torsional vibrations can be attenuated to suppress the "jara sounds", i.e., rattling sounds from being generated.

The torsional shock absorbing apparatus is constructed only to differentiate the sliding resistances between the first and second seat members supporting the circumferential ends of the coil spring in the positive rotation side and in the negative rotation side and the spring accommodation portion, thereby making the construction simplified without increasing the number of parts, and thereby making it possible to set an optimum hysteresis torque at the acceleration and deceleration times of the vehicle. As a consequence, the workability of the production operation of the torsional shock absorbing apparatus can be enhanced, and can prevent the production cost of the torsional shock absorbing apparatus from being increased.

The torsional shock absorbing apparatus as set forth in the definition (1), (2) the first seat member and the second seat member have respective outer peripheral portions slidable with respect to the spring accommodating portion.

The torsional shock absorbing apparatus is constructed to have the radial outer peripheral portions of the first seat member and the second seat member slidable with respect to the spring accommodating portion, thereby increasing the centrifugal forces of the first rotation member and the second rotation member in response to the increased rotation numbers of the first rotation member and the second rotation member, so that the outer peripheral portion of the first seat member can be brought into strong pressing engagement with the spring accommodation portion, and the hysteresis torques of the first rotation member and the second rotation member can be increased.

Due to the fact that the rotation fluctuation of the internal combustion engine at the acceleration time of the vehicle is large in the low rotation area, while being small in the high rotation area, in the case that the torsional shock absorbing apparatus is disposed between the internal combustion engine and the power transmission train having the transmission, at the acceleration time of the vehicle when the first rotation member is twisted with respect to the second rotation member in the positive rotation side, the hysteresis torque can be decreased in the low rotation area where the centrifugal forces of the first rotation member and the second rotation member are decreased, thereby making it possible to attenuate the torsional vibrations and thereby to suppress the "jara sounds" from being generated.

When, on the other hand, the rotation number of the internal combustion engine is increased, the centrifugal forces of the first rotation member and the second rotation member can be increased, so that the hysteresis torque can be increased, and can suppress the torsional vibrations when the rotation number of the internal combustion engine exceeds the rotation number corresponding to the torsional resonance point.

When the rotation number of the internal combustion engine is further increased, the centrifugal forces of the first rotation member and the second rotation member can be increased, the hysteresis torque can be increased, however, the torsional vibrations can be attenuated without being affected by the large hysteresis torque, resulting from the fact that the rotation fluctuation of the internal combustion engine is small in the high rotation area.

The torsional shock absorbing apparatus as set forth in the definition (1), or (2), (3) the first seat member and the spring accommodating portion forms together a gap therebetween, and the second seat member and the spring accommodating portion forms together a gap therebetween, the gap between the second seat member and the coil spring accommodating portion being larger than, the gap between the first seat member and the coil spring accommodating portion.

The torsional shock absorbing apparatus is constructed to have the gap between the second seat member and the coil spring accommodating portion being larger than the gap between the first seat member and the coil spring accommodating portion, the sliding resistance between the second seat member and the spring accommodation portion can be made smaller at the deceleration time of the vehicle when the first rotation member is twisted with respect to the second rotation member in the negative rotation side than at the acceleration time of the vehicle when the first rotation member is twisted with respect to the second rotation member in the positive rotation side.

This results in the fact that the hysteresis torque can be made large in the positive rotation side while being made small in the negative rotation side. As a consequence, the torsional vibrations can be attenuated, thereby making it possible to suppress the muffled sounds when the rotation number of the internal combustion engine exceeds the rotation number corresponding to the torsional resonance point at the acceleration time of the vehicle, while the torsional vibrations can be attenuated, thereby making it possible to suppress the "jara sounds" from being generated at the deceleration time of the vehicle.

The torsional shock absorbing apparatus as set forth in the definition (1), or (2), (4) the outer peripheral portion of the first seat member has a friction coefficient, and the outer peripheral portion of the second seat member has a friction coefficient, the friction coefficient of the outer peripheral portion of the first seat member being larger than the friction coefficient of the outer peripheral portion of the second seat member.

The torsional shock absorbing apparatus is constructed to have the friction coefficient of the outer peripheral portion of the first seat member larger than the friction coefficient of the outer peripheral portion of the second seat member, so that the hysteresis torque can be made large in the positive rotation side while being made small in the negative rotation side.

Therefore, the torsional vibrations caused when the rotation number of the internal combustion engine exceeds the rotation number corresponding to the torsional resonance point can be suppressed at the acceleration time of the vehicle, thereby making it possible to suppress the muffled sounds, while attenuating the torsional vibrations and thereby making it possible to suppress the "jara sounds" from being generated at the deceleration time of the vehicle.

The torsional shock absorbing apparatus as set forth in the definition (1), or (2), (5) the weight of the first seat member is larger than the weight of the second seat member. The torsional shock absorbing apparatus is constructed to have the weight of the first seat member larger than the weight of the second seat member, the outer peripheral portion of the first seat member larger in weight than the second seat member can be brought into strong slidable contact with the spring accommodation portion, when the centrifugal torque is generated by the rotations of the first rotation member and the second rotation member, so that the sliding resistance between the outer peripheral portion of the first seat member and the spring accommodation portion can be increased.

Further, the outer peripheral portion of the second seat member smaller in weight than the first seat member can be brought into weak slidable contact with the spring accommodation portion, thereby making it possible to decrease the sliding resistance between the second seat member and the spring accommodation portion.

For this reason, the hysteresis torque can be increased in the positive rotation side while the hysteresis torque can be decreased in the negative rotation side. Therefore, the torsional vibrations caused when the rotation number of the internal combustion engine exceeds the rotation number corresponding to the torsional resonance point can be suppressed, thereby making it possible to suppress the muffled sounds at the acceleration time of the vehicle, while attenuating the torsional vibrations and thereby to suppress the "jara sounds" from being generated at the deceleration time of the vehicle.

Advantageous Effects of Invention

The present invention can provide a torsional shock apparatus which can set an optimum hysteresis torque in the positive and negative rotation sides by the simple construction without increasing the number of parts, and can enhance the workability of the production operation of the torsional shock absorbing apparatus, and can prevent the production cost of the torsional shock absorbing apparatus from being increased.

DESCRIPTION OF EMBODIMENTS

The construction of the torsional shock absorbing apparatus will be explained hereinafter with reference to the accompanying drawings.

FIGS. 1 to 8 are views showing one embodiment of the torsional shock absorbing apparatus according to the present invention.

Firstly, the construction of the present embodiment will be explained hereinafter.

The present embodiment will be explained with an example in which the torsional shock absorbing apparatus 10 is applied to a clutch apparatus 1.

Figure 1:
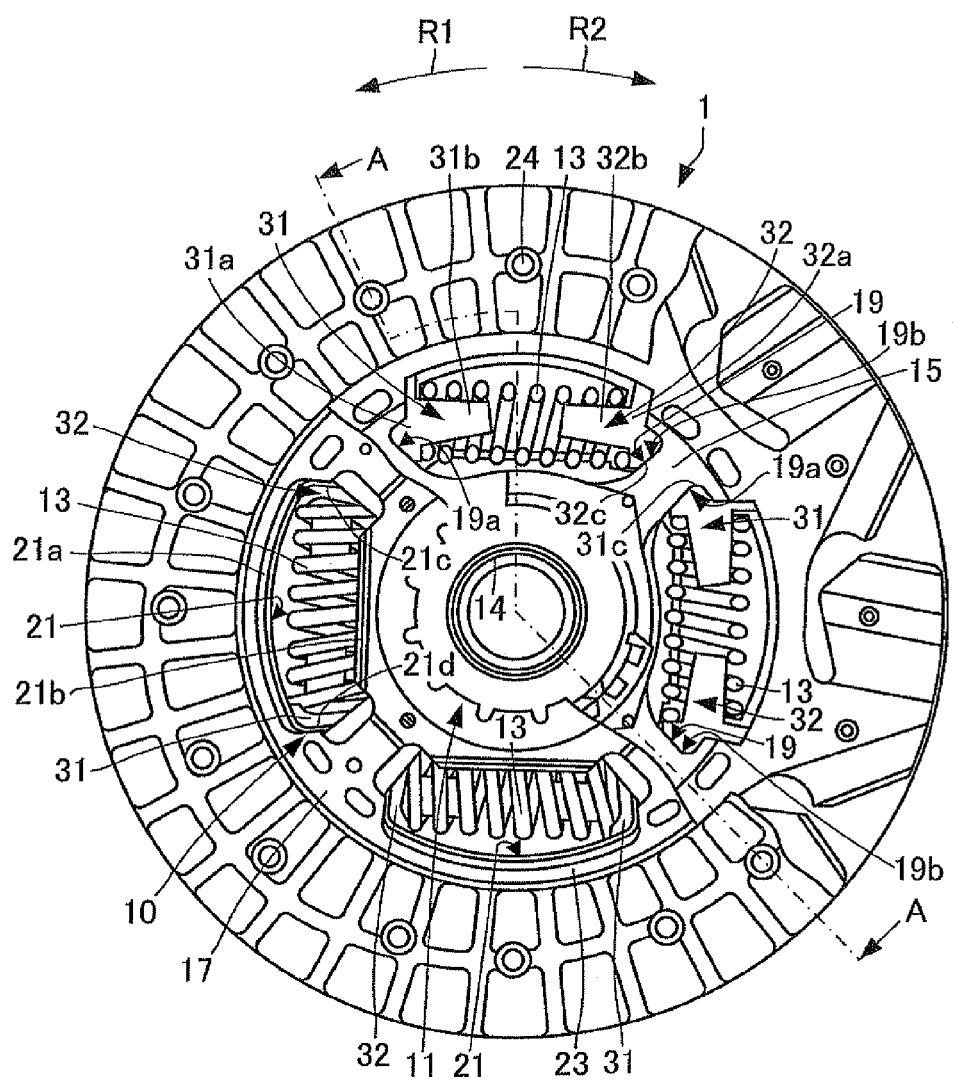
FIG. 1 is a view showing one embodiment of a torsional shock absorbing apparatus according to the present invention, and a front view of the torsional shock absorbing apparatus.
Figure 2:
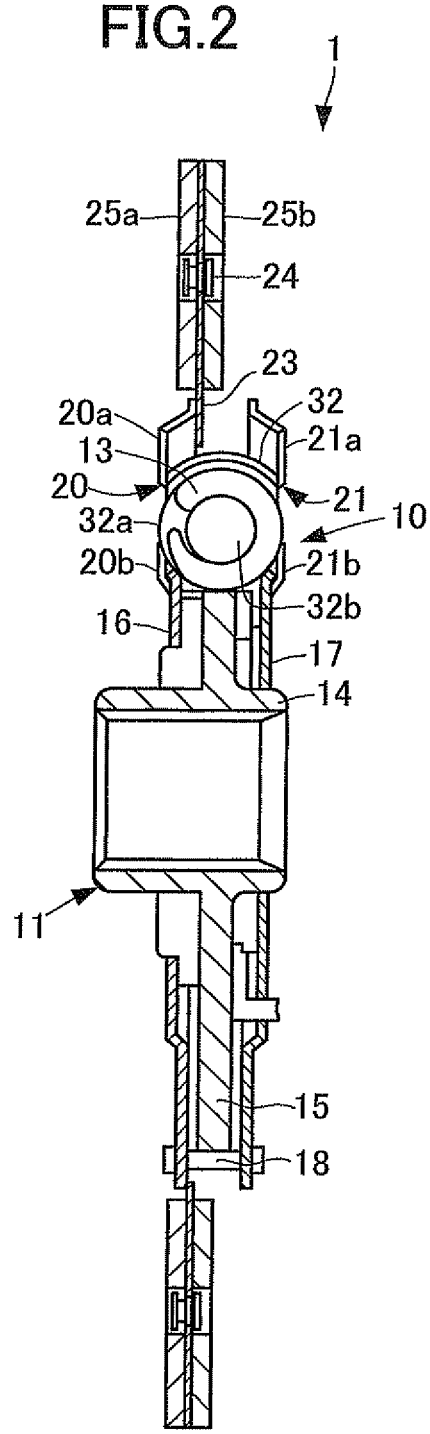
FIG. 2 is a view showing one embodiment of the torsional shock absorbing apparatus according to the present invention, and a cross-sectional view taken along and seen from the dotted line A-A of FIG. 1.
Figure 3:
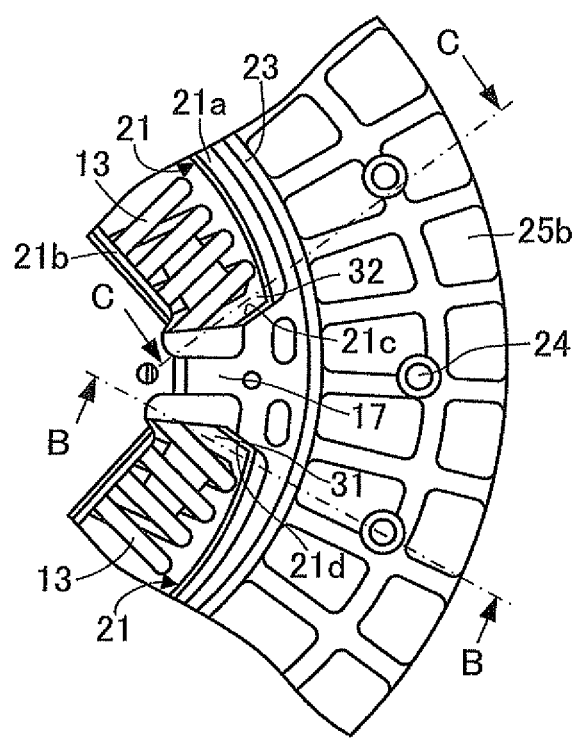
FIG. 3 is a view showing one embodiment of a torsional shock absorbing apparatus according to the present invention, and a front view of the essential part of the torsional shock absorbing apparatus.

The torsional shock absorbing apparatus 10 is shown in FIGS. 1 and 2 as comprising a hub 11 constituting a first rotation member, and side plates 16, 17 constituting a second rotation member, and disposed in coaxially rotatable relationship with the hub 11 and relatively rotatable with the hub 11, and four coil springs 13 respectively constituting springs resiliently connecting the hub 11 and the side plates 16, 17 with each other in the circumferential direction of the side plates 16, 17, and spring seats 31, 32 allowing the coil springs 13 to be supported on the hub 11.

The hub 11 is constructed to include a boss 14, and a flange portion 15 radially outwardly projecting from the boss 14.

The boss 14 has an inner peripheral portion splined to an input shaft forming part of the transmission not shown in the drawings.

Here, the hub 11 of the present embodiment adopts a type having the boss 14 and the flange portion 15 integrally formed, however, the present invention may include a type in which the boss 14 and the flange portion 15 are not integrally formed, viz., separated from each other, and which has extremely small springs arranged between the boss 14 and the flange portion 15 to absorb the small torsional vibrations between the boss 14 and the flange portion 15.

The previously mentioned construction of the torsional shock absorbing apparatus can suppress gears colliding sounds what is called "gara sounds", i.e., rattling sounds from being generated from the gear pairs forming part of the transmission in no load state in the small torque fluctuation of the internal combustion engine that is represented by a driving state in which the vehicle is shifted to its neutral state from its idling state.

The side plates 16, 17 are disposed at the both axial ends of the hub 11, and securely connected at their radially outer peripheral portions with each other by rivets 18.

The hub 11 is formed with four accommodating windows 19 each constituting a spring accommodating window, while the side plates 16, 17 are respectively formed with four accommodating windows 20, 21 each constituting a spring accommodating window in face-to-face relationship with the accommodating windows 19. The accommodating windows 19 and the accommodating windows 20, 21 allow the coil springs 13 to be accommodated therein. The accommodating windows 19 are constituted by a plurality of notches, i.e., grooves formed in the radially outer peripheral portion of the flange portion 15, while the accommodating windows 20, 21 are respectively constituted by openings formed by having the parts of the side plates 16, 17 punched out.

The spring seat (first seat member) 31 and the spring seat (second seat member) 32 are adapted to have the circumferential end portion of the coil spring 13 supported on the circumferential end portion of the accommodating window 19 of the hub 11. The term "circumferential" is intended to mean a direction the same as the rotation direction of the side plates 16, 17 and the hub, while the term "radial" is also intended to mean a direction the same as the radial direction of the side plates 16, 17 and the hub 11.

The spring seats 31, 32 are respectively provided with seat seating portions 31a, 32a having respective inner peripheral portions formed with winding roll seats, respectively, and projection portions 31b, 32b circumferentially projecting from the seat seating portions 31a, 32a.

The spring seat seating portions 31a, 32a have respective inner peripheral portions formed with winding roll seats, respectively. The winding roll seats are corresponding to one or two windings of the circumferential both end portions of the coil spring 13. The winding roll seats allow the circumferential both end portions of the coil spring 13 to seat thereon.

The winding roll seats of the spring seats 31 is formed with an engagement portion held in engagement with the winding starting ends of the coil spring 13, while the winding roll seats of the spring seats 32 is formed with an engagement portion held in engagement with the winding finishing ends of the coil spring 13. The engagement portions of the winding roll seats of the spring seats 31, 32 held in the winding starting and finishing ends of the coil spring 13 enable the coil spring 13 to be seated on the spring seats 31, 32 in the state that the coil spring 13 is prevented from being rotated.

The circumferential end portions 19a, 19b of the accommodating window 19 is held in engagement with the back surfaces of the spring seat seating portions 31a, 32a, i.e., the circumferential end portions 31c, 32c of the spring seats 31, 32. More concretely, the circumferential end portions 19a, 19b of the accommodating window 19 has a shape formed along the circumferential end portions 31c, 32c of the spring seats 31, 32, so that the circumferential end portions 19a, 19b of the accommodating window 19 are snugly engaged with the circumferential end portions 31c, 32c of the spring seats 31, 32.

For this reason, the spring seats 31, 32 receive the urging force of the coil spring 13 to be urged toward the circumferential end portions 19a, 19b of the accommodating window 19, so that the circumferential end portions 31c, 32c of the spring seats 31, 32 is brought into engagement with the circumferential end portions 19a, 19b of the accommodating window 19 under the strong pressing force, thereby causing the spring seats 31, 32 to be attached to the flange portion 15 of the hub 11.

As shown in FIGS. 1 to 5, the accommodating windows 20, 21 respectively have outer supporting edge portions 20a, 21a circumferentially extending along the radially outer edges of the accommodation windows 20, 21 and inner supporting edge portions 20b, 21b circumferentially extending along the radially inner edges of the accommodation windows 20, 21. The outer supporting edge portions 20a, 21a and the inner supporting edge portions 20b, 21b are projected axially outwardly from the surface of the side plates 16, 17.

The circumferential end portions 20c, 21c, 20d, 21d of the accommodating windows 20, 21 are positioned axially inwardly of the side plates 16, 17 with respect to the outer supporting edge portions 20a, 21a and the inner supporting edge portions 20b, 21b. The circumferential end portions 20c, 21c, 20d, 21d of the accommodating windows 20, 21 are held in engagement with the circumferential end portions 31c, 32c of the spring seats 31, 32.

Therefore, the spring seat 31, 32 are disposed between the circumferential end portions 19a, 19b of the accommodating window 19 and the both circumferential end surfaces of the coil spring 13, and between the circumferential end portions 20c, 21c, 20d, 21d of the accommodating windows 20, 21 and the both circumferential end surfaces of the coil spring 13.

The spring seats 31, 32 has respective radially outer peripheral portions are positioned radially outwardly of the accommodating windows 19, and positioned radially inwardly of the radially inner peripheral portions of the accommodating windows 20, 21.

The torsional shock absorbing apparatus 10 thus constructed comprises an annular cushioning plate 23 having an radially inner peripheral portion securely connected with the radially outer peripheral portion of the side plate 16. For the connection of the side plate 16 and the cushioning plate 23 are used rivets 18 for connecting the side plates 16, 17 with each other.

The cushioning plate 23 has both axial sides securely connected with annular friction materials 25a, 25b by rivets 24. The friction materials 25a, 25b are disposed between a flywheel not shown drivably connected with a crank shaft forming part of the internal combustion engine and a pressure plate forming part of a clutch cover bolted to the flywheel.

The friction plates 25a, 25b are pressurized to the pressure plate to bring the pressure plate into frictional engagement with the flywheel, thereby making it possible to input the rotation torque of the internal combustion engine to the side plates 16, 17.

When the clutch pedal not shown is depressed, the pressure plate is operated to release the friction materials 25a, 25b from being pressurized to have the friction materials 25a, 25b moved away from the flywheel, thereby making it possible not to input the rotation torque of the internal combustion engine to the side plates 16, 17.

When the hub 11 is twisted with respect to the side plates 16, 17 in a positive rotation side (R2 direction in FIG. 1) and in the negative rotation side (R1 direction in FIG. 1), the coil springs 13 are compressed to have the spring seat 31 or spring seat 32 selectively move along the accommodating windows 20, 21.

The coil spring 13 is compressed when the hub 11 is twisted with respect to the side plates 16, 17 in a positive rotation side, and when the hub 11 is twisted with respect to the side plates 16, 17 in the negative rotation side, so that the rotation torque can be transmitted between the hub 11 and the side plates 16, 17.

The positive twisting of the hub 11 with respect to the side plates 16, 17 occurs at the acceleration time of the vehicle, while the negative twisting of the hub 11 with respect to the side plates 16, 17 occurs at the deceleration time of the vehicle when the engine brake is generated.

Figure 4:
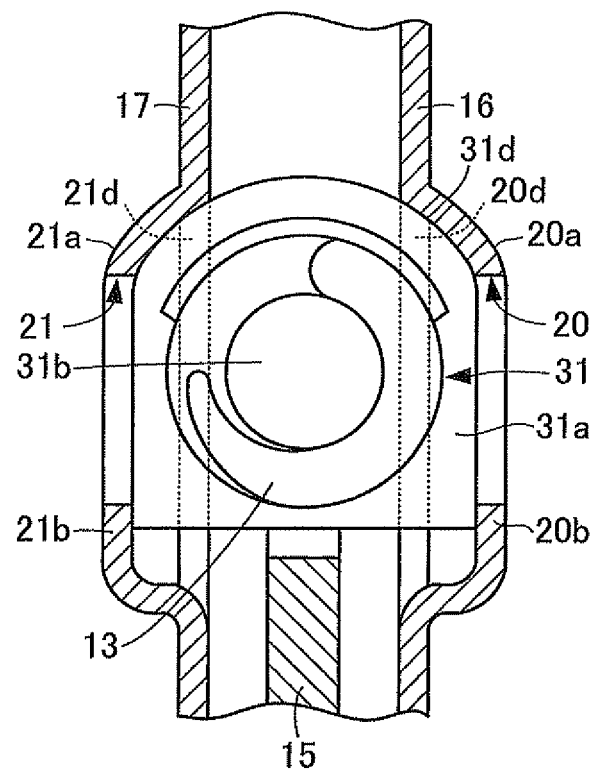
FIG. 4 is a view showing one embodiment of the torsional shock absorbing apparatus according to the present invention, and a cross-sectional view taken along and seen from the dotted line B-B of FIG. 3.

On the other hand, the radial peripheral portion (hereinafter simply referred to as "upper portion 31d") positioned radially outwardly of the seat seating portion 31a of the spring seat 31 is always held in contact with the inner peripheral portions of the outer supporting edge portions 20a, 21a as shown in FIG. 4.

Figure 5:
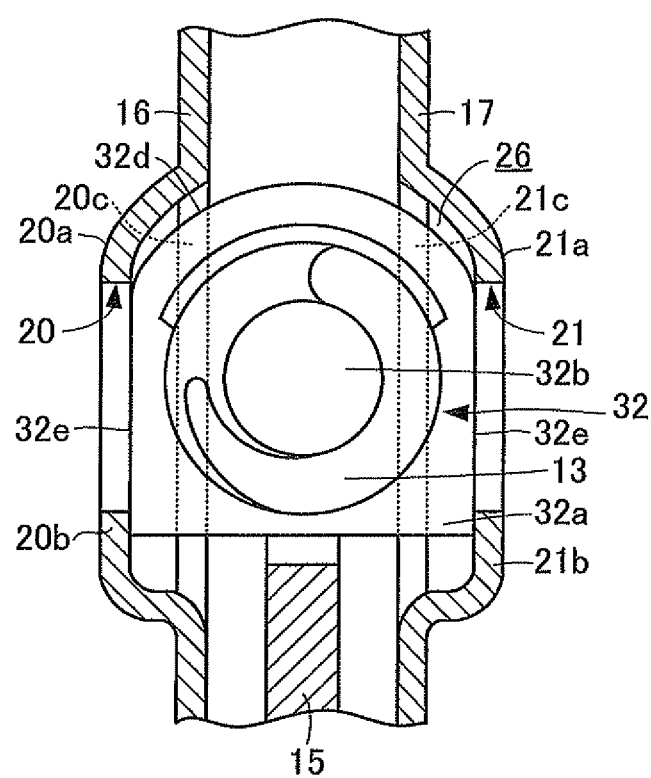
FIG. 5 is a view showing one embodiment of the torsional shock absorbing apparatus according to the present invention, and a cross-sectional view taken along and seen from the dotted line C-C of FIG. 3.

Further, a gap 26 is formed between the radial peripheral portion (hereinafter simply referred to as "upper portion 32d") positioned radially outwardly of the seat seating portion 32a of the spring seat 32 and the inner peripheral portions of the outer supporting edge portions 20a, 21a as shown in FIG. 5. The radial length of the seat seating portion 31a of the spring seat 31 is formed to be longer than the radial length of the seat seating portion 32a of the spring seat 32.

This means that when the hub 11 is twisted with respect to the side plates 16, 17 in the positive rotation side, the upper portion 31d of the seat seating portion 31a of the spring seat 31 slides in contact with the outer supporting edge portions 20a, 21a, thereby increasing the sliding resistance (frictional force) of the spring seat 31 and the side plates 16, 17.

When, on the other hand, the hub 11 is twisted with respect to the side plates 16, 17 in the negative rotation side, the upper portion 32d of the seat seating portion 32a of the spring seat 32 comes to be not in contact with the outer supporting edge portions 20a, 21a, thereby decreasing the sliding resistance (frictional force) of the spring seat 31 and the side plates 16, 17.

Next, the operation of the torsional shock absorbing apparatus will be explained hereinafter.

In the state that the clutch apparatus 1 is not imparted with a rotation torque sufficient to compress the coil spring 13, the relative rotation angle of the hub 11 and the side plates 16, 17 is about zero degree.

From this state, the driving torque (rotation torque) of the internal combustion engine is transmitted to the cushioning plate 23 of the clutch apparatus 1 through the friction materials 25a, 25b, and then transmitted to the side plate 17 connected with the cushioning plate 23.

The rotational fluctuation caused by the torque fluctuation of the internal combustion engine and applied to the clutch apparatus 1 is buffered between the side plates 16, 17 and the hub 11 by the coil spring 13 compressed while being transmitted to the input shaft of the transmission.

The following explanation will be directed to the operations for the cases in which the hub 11 is twisted with respect to the side plates 16, 17 in the positive rotation side, and in which the hub 11 is twisted with respect to the side plates 16, 17 in the negative rotation side. Here, the rotation direction of the side plates 16, 17 when the rotation torque is transmitted from the internal combustion engine to the transmission is represented by a R1 direction.

In response to the increased rotational fluctuation of the internal combustion engine at the acceleration time of the vehicle, the relative rotation of the side plates 16, 17 and the hub 11 is increased, viz., the torsion angle of the side plates 16, 17 and the hub 11 is increased, thereby causing the hub 11 to be twisted with respect to the side plates 16, 17 in the positive rotation side, so that the coil spring 13 is compressed to have the rotation torque transmitted from the side plates 16, 17 to the hub 11.

When the torsion angle of the side plates 16, 17 and the hub 11 is increased, the hub 11 is relatively rotated with respect to the side plate 16, 17 in the R2 direction as the side plates 16, 17 are rotated in the R1 direction.

Figure 6:
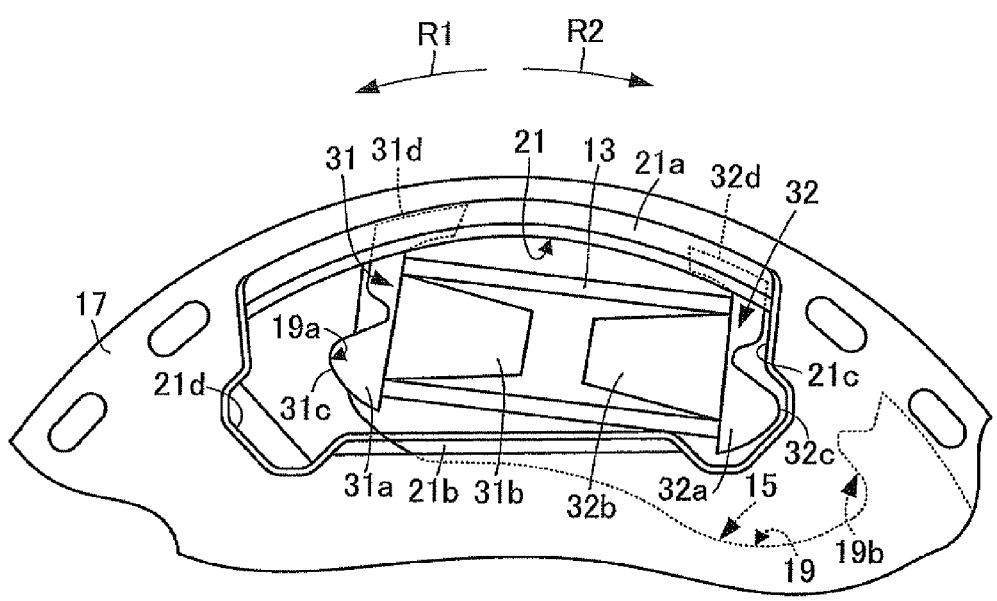
FIG. 6 is a view showing one embodiment of the torsional shock absorbing apparatus according to the present invention, and a view showing the state of a spring seat at the acceleration time of the vehicle.

The actions of the side plates 16, 17 and the hub 11 at this time will be described with reference to FIG. 6. FIG. 6 does not show the side plate 16, but the side plate 16 moves in parallel with the side plate 17, so that the side plate 16 will be explained with the reference of the side plate 17.

When the side plates 16, 17 are rotated in the R1 direction in FIG. 6, the circumferential end portions 20c, 21c, of the accommodating windows 20, 21 of the side plates 16, 17 pressurize the spring seat 32 toward the spring seat 31. At this time, the circumferential end portion 19b of the accommodating window 19 of the hub 11 is moved away from the spring seat 32.

As the hub 11 is relatively rotated with respect to the side plates 16, 17 in the R2 direction, the circumferential end portion 19a of the accommodating window 19 of the hub 11 pressurizes the spring seat 31 toward the spring seat 32.

At this time, the spring seat 31 moves away from the circumferential end portions 20d, 21d of the accommodating windows 20, 21. The spring seat 31 is constructed to have the upper portion 31d of the seat seating portion 31a always held in contact with the inner peripheral portions of the outer supporting edge portions 20a, 21a. For this reason, the upper portion 31d of the seat seating portion 31a is pressurized to the inner peripheral portions of the outer supporting edge portions 20a, 21a by the centrifugal forces of the side plates 16, 17, thereby increasing the sliding resistance between the spring seat 31 and the inner peripheral portions of the outer supporting edge portions 20a, 21a, and thereby increasing the hysteresis torque of the hub 11 and the side plates 16, 17.

As a consequence, the spring seats 31, 32 move toward each other to enable the coil spring 13 to be compressed, thereby making it possible to buffer the rotational fluctuation of the internal combustion engine while transmitting the driving torque of the internal combustion engine to the input shaft of the transmission.

On the other hand, at the deceleration time of the vehicle, the driving torque of the internal combustion engine is decreased while generating the engine brake, so that the rotation torque is input to the hub 11 from the input shaft of the transmission.

When the rotational fluctuation of the internal combustion engine is increased at the deceleration time of the vehicle, the torsion angle of the side plates 16, 17 and the hub 11 is increased, thereby causing the hub 11 to be twisted with respect to the side plates 16, 17 in the negative rotation side, so that the coil spring 13 is compressed to have the rotation torque transmitted from the hub 11 to the side plates 16, 17.

When the torsion angle of the side plates 16, 17 and the hub 11 is increased, the side plates 16, 17 are relatively rotated with respect to the hub 11 in the R2 direction as the hub 11 is rotated in the R1 direction.

Figure 7:
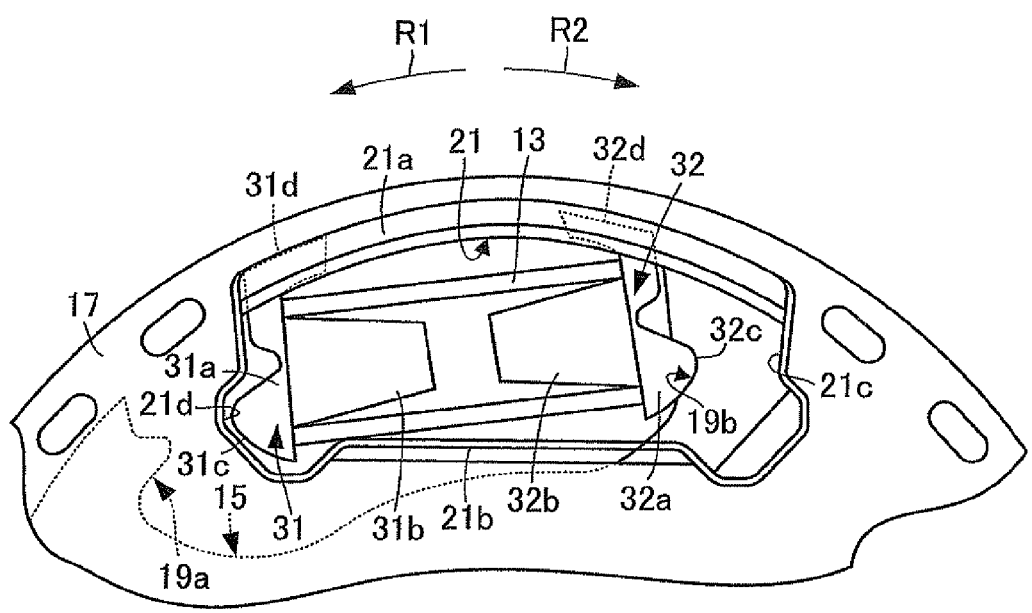
FIG. 7 is a view showing one embodiment of the torsional shock absorbing apparatus according to the present invention, and a view showing the state of a spring seat at the deceleration time of the vehicle.

The actions of the side plates 16, 17 and the hub 11 at this time will be described with reference to FIG. 7. FIG. 7 does not show the side plate 16, but the side plate 16 moves in parallel with the side plate 17, so that the side plate 16 will be explained with the reference of the side plate 17.

When the side plates 16, 17 are rotated in the R2 direction in FIG. 7, the circumferential end portions 20d, 21d, of the accommodating windows 20, 21 of the side plates 16, 17 pressurize the spring seat 31 toward the spring seat 32. At this time, the circumferential end portion 19a of the accommodating window 19 of the hub 11 is moved away from the spring seat 31.

As the hub 11 is relatively rotated with respect to the side plates 16, 17 in the R1 direction, the circumferential end portion 19b of the accommodating window 19 of the hub 11 pressurizes the spring seat 32 toward the spring seat 31.

At this time, the spring seat 32 moves away from the circumferential end portions 20c, 21c of the accommodating windows 20, 21. The spring seat 32 is formed with a gap 26 between the upper portion 32d of the seat seating portion 32a and the outer peripheral portion of the outer supporting edge portions 20a, 21a, thereby allowing the upper portion 32d of the seat seating portion 32a to be not held in contact with the inner peripheral portions of the outer supporting edge portions 20a, 21a. This makes it possible not to generate the sliding resistance between the upper portion 32d of the seat seating portion 32a of the spring seat 32 and the inner peripheral portions of the outer supporting edge portions 20a, 21a.

Therefore, as shown in FIG. 5, the spring seat 32 has only the axial side surface 32e of the seat seating portion 32a held in contact with the outer supporting edge portions 20a, 21a of the side plates 16, 17, thereby making it possible to decrease the hysteresis torque of the hub 11 and the side plates 16, 17.

As a consequence, the spring seats 31, 32 moves toward each other to enable the coil spring 13 to be compressed, so that the rotation fluctuation of the internal combustion engine can be buffered between the side plates 16, 17 and the hub 11.

Figure 9:
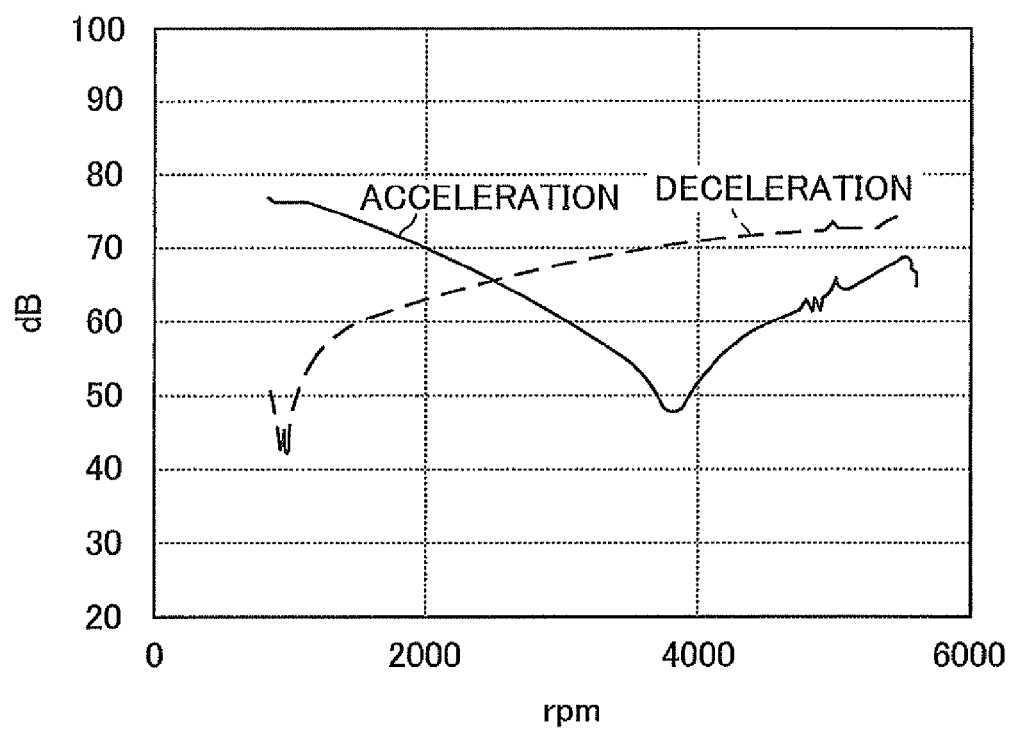
FIG. 9 is a view showing one embodiment of the torsional shock absorbing apparatus according to the present invention, and a graph showing the relationship of the rotation fluctuations of the internal combustion engine and the rotation number of the internal combustion engine.
Figure 10:
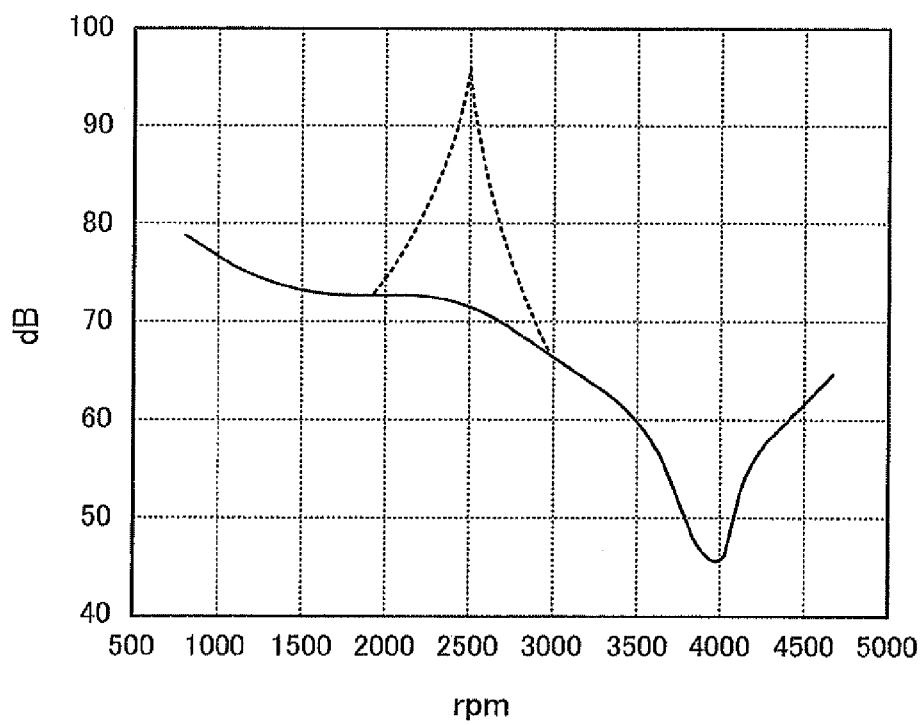
FIG. 10 is a view showing one embodiment of the torsional shock absorbing apparatus according to the present invention, and a graph showing the relationship of the rotation fluctuations of the internal combustion engine and the rotation number of the internal combustion engine with the small hysteresis torque at the acceleration time of the vehicle.

Here, as shown in FIG. 9, that the rotation fluctuation of the internal combustion engine at the acceleration time of the vehicle is large in the low speed rotation area of the internal combustion engine. The rotation fluctuation of the internal combustion engine at the acceleration time of the vehicle becomes smaller in the high speed rotation area of the internal combustion engine than that in the low speed rotation area of the internal combustion engine. Further, the rotation fluctuation of the internal combustion engine at the deceleration time of the vehicle is large in the high speed rotation area of the internal combustion engine. It will therefore be understood that the torque fluctuation of the internal combustion engine is different in property at the acceleration time of the vehicle from at the deceleration time of the vehicle.

In the present embodiment, the gap between the upper portion 32d of the seat seating portion 32a of the spring seat 32 and the inner peripheral portions of the outer supporting edge portions 20a, 21a is formed to be larger than the gap between the upper portion 31d of the seat seating portion 31a of the spring seat 31 and the inner peripheral portions of the outer supporting edge portions 20a, 21a. In other words, the upper portion 31d of the seat seating portion 31a of the spring seat 31 and the inner peripheral portions of the outer supporting edge portions 20a, 21a are always held in contact with each other, while the gap 26 is formed between the upper portion 32d of the seat seating portion 32a of the spring seat 32 and the inner peripheral portions of the outer supporting edge portions 20a, 21a, thereby making it possible to raise the sliding resistance of the spring seat 31 and the outer supporting edge portions 20a, 21a at a level higher than that of the sliding resistance of the spring seat 32 and the outer supporting edge portions 20a, 21a.

For this reason, the hysteresis torque can be increased at the acceleration time of the vehicle when the hub 11 is twisted with respect to the side plates 16, 17 in the positive rotation side, while the hysteresis torque can be decreased at the deceleration time of the vehicle when the hub 11 is twisted with respect to the side plates 16, 17 in the negative rotation side.

Further, as the rotation number of the internal combustion engine is increased, the centrifugal forces of the hub 11 and the side plates 16, 17 are increased, thereby strengthening the pressing force to have the upper portion 31d of the seat seating portion 31a pressurized to the outer supporting edge portions 20a, 21a at a higher level in response to the increased rotation number of the internal combustion engine at the acceleration time of the vehicle, thereby making it possible to increase the hysteresis torque at a higher level in response to the increased rotation number of the internal combustion engine.

Therefore, as shown in FIG. 9, the centrifugal forces of the hub 11 and the side plates 16, 17 can be decreased in the low speed rotation area (for example less than 1800 rpm) of the internal combustion engine where the rotation fluctuation of the internal combustion engine is increased, thereby making it possible to decrease the hysteresis torque at the acceleration time of the vehicle at a lower level than that in the high speed rotation area of the internal combustion engine. For this reason, the torsional vibrations can be attenuated and thereby can suppress the "jara sounds", i.e., rattling sounds from being generated.

When, on the other hand, the rotation number of the internal combustion engine is increased, the centrifugal forces of the hub 11 and the side plates 16, 17 are increased. For this reason, the hysteresis torque can be increased when the rotation number of the internal combustion engine is increased to exceed the rotation number corresponding to the torsional resonance point (for example about 2500 rpm for "FF" vehicle). As a consequence, the torsional resonance can be suppressed, and the muffled sounds can also be suppressed from being generated.

When the rotation number of the internal combustion engine is further increased, the centrifugal forces of the hub 11 and the side plates 16, 17 are further increased, so that the hysteresis torque is also increased but the rotation fluctuation becomes smaller in the high speed rotation area of the internal combustion engine than that in the low speed rotation area of the internal combustion engine. As a consequence, the torsional vibrations can be attenuated without being subject to the effect of a large hysteresis torque.

Further, at the time deceleration time of the vehicle when the hub 11 is twisted with respect to the side plates 16, 17 in the negative rotation side, the sliding resistance between the spring seat 32 and the outer supporting edge portions 20a, 21a can be prevented from being generated, thereby making it possible to decrease the sliding resistance between the spring seat 32 and the accommodating windows 20, 21 at a lower level than that at the acceleration time of the vehicle, and thereby making it possible to decrease the hysteresis torque.

For this reason, as shown in FIG. 9, torsional resonance can be attenuated in the high speed rotation area of the internal combustion engine where the rotation number of the internal combustion engine is large, and the "jara sounds", i.e., rattling sounds can be suppressed from being generated.

From the foregoing description, it will be understood that the present embodiment is constructed to have the sliding resistances of the spring seats 31, 32 and the outer supporting edge portions 20a, 21a different from each other in the positive and negative rotation sides. The present embodiment is therefore simple in construction and can set an optimum hysteresis torque at the acceleration and deceleration times of the vehicle without increasing the number of parts. As a consequence, the workability of the production operation of the torsional shock absorbing apparatus 10 can be enhanced, and can prevent the production cost of the torsional shock absorbing apparatus 10 from being increased.

Further, the present embodiment previously mentioned is constructed to have the upper portion 31d of the seat seating portion 31a of the spring seat 31 and the inner peripheral portions of the outer supporting edge portions 20a, 21a are always held in contact with each other, while the gap 26 is formed between the upper portion 32d of the seat seating portion 32a of the spring seat 32 and the inner peripheral portions of the outer supporting edge portions 20a, 21a, thereby making it possible to raise the sliding resistance of the spring seat 31 and the outer supporting edge portions 20a, 21a at a level higher than that of the sliding resistance of the spring seat 32 and the outer supporting edge portions 20a, 21a. However, the present invention is not limited to this embodiment.

Figure 8:
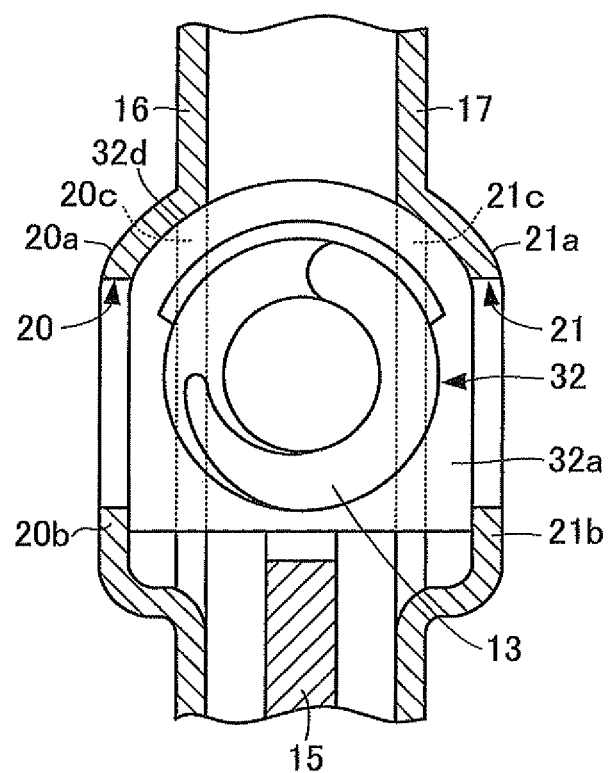
FIG. 8 is a view showing one embodiment of the torsional shock absorbing apparatus according to the present invention, and similar to FIG. 3, viz., a cross-sectional view taken along and seen from the dotted line C-C of FIG. 3 but including coil springs in another shape.

As shown in FIG. 8, another embodiment according to the present invention is constructed to have the radial length of the seat seating portion 32a of the spring seat 32 formed to be the same as the radial length of the seat seating portion 31a of the spring seat 31, and thereby to have the upper portion 32d of the seat seating portion 32a of the spring seat 32 always held in contact with the outer supporting edge portions 20a, 21a.

In this case, the frictional coefficient of the spring seat 31 may be set to be larger than the frictional coefficient of the spring seat 32 to have the sliding resistance of the upper portion 31d of the seat seating portion 31a and the inner peripheral portions of the outer supporting edge portions 20a, 21a increased at a level higher than that of the sliding resistance of the upper portion 32d of the seat seating portion 32a and the inner peripheral portions of the outer supporting edge portions 20a, 21a. The above embodiment thus constructed can also increase the hysteresis torque at the acceleration time of the vehicle, while can also decrease the hysteresis torque at the deceleration time of the vehicle.

In order to differentiate the frictional coefficients of the spring seats 31, 32, the outer peripheral portion of the seat seating portion 31a of the spring seat 31 may be constructed by materials each having a large frictional coefficient, while the outer peripheral portion of the seat seating portion 32a of the spring seat 32 may be constructed by materials each having a small frictional coefficient.

Alternatively, the materials of the seat seating portions 31a, 32a of the spring seats 31, 32 may be the same as each other, and the outer peripheral portion of the seat seating portion 32a of the spring seat 32 may be formed to have a smooth surface, thereby decreasing the frictional coefficient, while the outer peripheral portion of the seat seating portion 31a of the spring seat 31 may be formed to have a rough surface to increase the frictional coefficient.

As shown in FIG. 8, the radial length of the seat seating portion 32a of the spring seat 32 may be formed to be the same as the radial length of the seat seating portion 31a of the spring seat 31, and the weight of the spring seat 31 may be formed to be larger than the weight of the spring seat 32.

In this case, when the side plates 16, 17 are rotated to generate the centrifugal force, the upper portion 31*d* of the seat seating portion 31*a* of the spring seat 31 larger in weight than the spring seat 32 can be brought into pressing and sliding contact with the inner peripheral portions of the outer supporting edge portions 20*a*, 21*a* under a relatively strong force, thereby making it possible to increase the sliding resistance of the upper portion 31*d* of the seat seating portion 31*a* of the spring seat 31 and the inner peripheral portions of the outer supporting edge portions 20*a*, 21*a*.

Further, when the side plates 16, 17 are rotated to generate the centrifugal force, the upper portion 32*d* of the seat seating portion 32*a* of the spring seat 32 smaller in weight than the spring seat 31 can be brought into pressing and sliding contact with the inner peripheral portions of the outer supporting edge portions 20*a*, 21*a* under a relatively weak force, thereby making it possible to decrease the sliding resistance of the upper portion 32*d* of the seat seating portion 32*a* of the spring seat 32 and the inner peripheral portions of the outer supporting edge portions 20*a*, 21*a*.

In this way, the hysteresis torque can be increased at the acceleration time of the vehicle, while the hysteresis torque can be decreased at the deceleration time of the vehicle. Therefore, at the acceleration time of the vehicle, the torsional vibrations caused after the torsional resonance point can be suppressed, and the muffled sounds can be suppressed from being generated, while at the deceleration time of the vehicle, the torsional vibrations can be attenuated to suppress the "jara sounds", i.e., rattling sounds from being generated.

Further, the present embodiment has been explained about the case that the torsional shock absorbing apparatus 10 is applied to the clutch apparatus 1, however, the present invention is not limited to this embodiment, but may be applied to the torsional shock absorbing apparatus disposed in any type of power transmission train of the vehicle. If the torsional shock absorbing apparatus is applied to the hybrid vehicle, the torsional shock absorbing apparatus may be applied to a torsional shock absorbing apparatus represented by such as for example a hybrid damper intervening between the output shaft of the internal combustion engine and a power splitting mechanism for splitting the driving forces to an electric motor and an output shaft drivably connected with vehicle wheels.

Further, the torsional shock absorbing apparatus according to the present invention may be applied to a lockup damper intervening between a lockup clutch apparatus forming part of a torque converter and a transmission gear sets. The torsional shock absorbing apparatus according to the present invention may be disposed between a differential case and a ring gear provided at the outer peripheral portion of the differential case.

The previously mentioned embodiments have been raised as examples to explain the present invention, however, the present invention is not limited to these embodiments. The scope of the present invention should be construed based on the claims but not on these embodiments. It is needless to say that the equivalents and modifications of the elements or parts defined in claims should be incorporated within the scope of the present invention.

From the foregoing description, it will be understood that the torsional shock absorbing apparatus according to the present invention has such an advantageous effect that the torsional shock absorbing apparatus simple in construction without increasing the number of parts can set an optimum hysteresis torque in the positive and negative rotation sides, and can enhance the workability of the production operation of the torsional shock absorbing apparatus, and can prevent the production cost of the torsional shock absorbing apparatus from being increased. The present invention is useful as a torsional shock absorbing apparatus for transmitting the torque while absorbing the torque fluctuation by the springs.

REFERENCE SIGNS LIST

10: torsional shock absorbing apparatus
11: hub (first rotation member)
13: coil spring (spring)
16, 17: side plates (second rotation member)
19: accommodating window
20, 21: accommodating windows
31: spring sheet (first sheet member)
32: spring sheet (second sheet member)

The invention claimed is:

1. A torsional shock absorbing apparatus, comprising:
a first rotation member having spring accommodating windows formed therein,
a second rotation member disposed in coaxially rotatable relationship with the first rotation member and having spring accommodating portions positioned in face-to-face relationship with the first rotation member,
springs partly disposed in the spring accommodating windows and the spring accommodating portions and compressed in response to the positive and negative torsional movements of the first rotation member with respect to the second rotation member to have the torque transmitted between the first rotation member and the second rotation member,
a first seat member and a second seat member respectively disposed between the circumferentially end portions of the springs and the circumferentially end portions of the spring accommodating windows and the coil spring accommodating portions, for supporting circumferentially end surfaces of the springs respectively,
the first seat member having an outer peripheral portion movable along the coil spring accommodating portion of the second rotation member in response to the positive torsional movement of the first rotation member with respect to the second rotation member, and the second seat member having an outer peripheral portion movable along the coil spring accommodating portion of the second rotation member in response to the negative torsional movement of the first rotation member with respect to the second rotation member,
the first seat member and the coil spring accommodating portion having a sliding resistance to be generated therebetween, and the second seat member and the coil spring accommodating portion having a sliding resistance to be generated therebetween, the sliding resistance of the first seat member and the coil spring accommodating portion being larger than the sliding resistance of the second seat member and the coil spring accommodating portion.

2. The torsional shock absorbing apparatus as set forth in claim 1, in which the first seat member and the second seat member have respective outer peripheral portions slidable with respect to the spring accommodating portion.

3. The torsional shock absorbing apparatus as set forth in claim 1, in which the first seat member and the spring accommodating portion forms together a gap therebetween, and the second seat member and the spring accommodating portion forms together a gap therebetween, the gap between the second seat member and the coil spring accommodating portion being larger than, the gap between the first seat member and the coil spring accommodating portion.

4. The torsional shock absorbing apparatus as set forth in claim 1, in which the outer peripheral portion of the first seat member has a friction coefficient, and the outer peripheral portion of the second seat member has a friction coefficient, the friction coefficient of the outer peripheral portion of the first seat member being larger than the friction coefficient of the outer peripheral portion of the second seat member.

5. The torsional shock absorbing apparatus as set forth in claim 1, in which the weight of the first seat member is larger than the weight of the second seat member.

\* \* \* \* \*